United States Patent
Dietz et al.

(10) Patent No.: US 12,397,525 B2
(45) Date of Patent: Aug. 26, 2025

(54) PLANNING MOVEMENTS FOR A SERVO PRESS

(71) Applicant: Siemens Aktiengesellschaft, Munich (DE)

(72) Inventors: Bernd Dietz, Herzogenaurach (DE); Stephan Hoja, Cadolzbrug (DE); Tina Stöckel, Bubenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 1107 days.

(21) Appl. No.: 16/576,159

(22) Filed: Sep. 19, 2019

(65) Prior Publication Data

US 2020/0094404 A1  Mar. 26, 2020

(30) Foreign Application Priority Data

Sep. 20, 2018 (EP) ..................... 18195760

(51) Int. Cl.
*B30B 15/14* (2006.01)
*B21D 43/05* (2006.01)
*B30B 15/26* (2006.01)
*B30B 15/28* (2006.01)

(52) U.S. Cl.
CPC ............. *B30B 15/14* (2013.01); *B21D 43/05* (2013.01); *B30B 15/26* (2013.01); *B30B 15/28* (2013.01)

(58) Field of Classification Search
CPC ..... B30B 15/14; B30B 15/144; B30B 15/146; B30B 15/148; B30B 15/28; B21D 43/05; B21D 43/052; B21D 43/055
See application file for complete search history.

(56) References Cited

U.S. PATENT DOCUMENTS

| | | | |
|---|---|---|---|
| 7,636,612 B2 * | 12/2009 | Weber | G05B 19/4069 717/124 |
| 2007/0172344 A1 | 7/2007 | Reichenbach | |
| 2008/0109105 A1 | 5/2008 | Weber et al. | |
| 2010/0000424 A1 * | 1/2010 | Kaneko | B30B 15/148 100/207 |
| 2013/0104613 A1 * | 5/2013 | Kaneko | B30B 15/148 72/20.5 |
| 2014/0364997 A1 * | 12/2014 | Kaneko | B25J 9/1664 700/228 |
| 2015/0053101 A1 * | 2/2015 | Hedler | B30B 1/268 100/285 |

(Continued)

FOREIGN PATENT DOCUMENTS

| | | |
|---|---|---|
| CN | 1252327 | 5/2000 |
| CN | 1917973 | 2/2007 |

(Continued)

OTHER PUBLICATIONS

Office Action dated Jan. 22, 2021 issued Chinese Patent Application No. 201910894009.4.

*Primary Examiner* — Christopher L Templeton
*Assistant Examiner* — Matthew Stephens
(74) *Attorney, Agent, or Firm* — Cozen O'Connor (57) ABSTRACT

A method for planning movements for a servo press and a movement controller configured to plan movements for a servo press and an associated computer program product, wherein a minimum transfer time and a minimum return time are taken into account in a movement cycle for a transport apparatus.

12 Claims, 3 Drawing Sheets

(56) References Cited

U.S. PATENT DOCUMENTS

2018/0117869 A1    5/2018  Hoja et al.
2020/0180252 A1*   6/2020  Sakurai ................ B30B 15/148
                                                           72/20.5

FOREIGN PATENT DOCUMENTS

DE       102005024822        11/2006
EP          2746880 B1        4/2018
EP          3315267           5/2018

* cited by examiner

PLANNING MOVEMENTS FOR A SERVO PRESS

BACKGROUND OF THE INVENTION

1. Field of the Invention

The invention relates to a method for planning movements for a servo press and a movement controller configured to plan movements for a servo press and an associated computer program product.

2. Description of the Related Art

Presses, e.g., servo presses, are used for forming or pressing material in the forming industry. Here, use is also made of presses that have a plurality of processing stations within a single press. Here, in particular, the press or forming movement is the same in all processing stations or the cycle of all tools is the same in the individual processing stations. This means that a transport system, also referred to as a transfer system or transfer, performs a movement of goods to be processed within the servo press during the uniform opening phase of the servo press. That is, the transfer has the possibility of moving material within the servo press, in particular moving material into the press, moving material out of the press or repositioning material within the press, without a collision occurring between the transfer and the servo press when the servo press is opened.

The various processing stations within a servo press particularly correspond to individual forming stages of the workpiece to be formed within the press, in particular via individual tools.

Depending on parameters, such as the size or the weight of the workpiece or of the apparatuses, the transfer system requires a sufficient amount of space and time to perform the transport task.

Depending on forming parameters, a suitable movement profile of the press arises depending on how the workpiece should be formed in a press. The movement profile specifies how the press forming movement is performed and the movement outside of the forming region.

Programmable profiles can be driven in a servo press. An associated transfer system or handling system should be synchronized with such a programmable servo press profile. The use of a virtual press encoder for synchronization purposes is known. The virtual press encoder maps the machine clock in a 360° cycle in a manner similar to that in a mechanical flywheel driven press and can consequently be used as a machine reference. By way of example, using this, the press profile is defined as a cam disk depending on this master value. What emerges from this is that a change in the movement profile of the servo press also requires an adaptation of the profiles of the transfer systems, for example. By way of example, a change in the press profile changes the relationship between virtual master value and press opening such that the master value is adapted or displaced during the transfer as a result. By way of example, a lower speed of the press during the forming also requires more time for the handling system in this section. This changes the reference points between transfer system and press.

Conventionally, a component is "run-in" by trial and error, and the suitable setting thus ascertained is stored, as it were, as a recipe and as a data record. When adapting or changing the transfer movement, a servo press profile should be adapted to the transfer movement. Conventionally, this is implemented once again by way of trial-and-error methods. Likewise, a modified movement profile of the servo press has, as a consequence, a new run-in and new testing of the transport movement. Should collisions arise during the test, it is necessary to ascertain a suitable transfer movement profile manually.

There are conventional optimization methods that allow an admissible movement profile for a servo press to be ascertained, without taking account of the transfer. A movement of the transfer system can be adapted for a movement profile ascertained thus, with the servo press movement profile being varied by trial and error until a realizable transfer movement profile fits therewith.

SUMMARY OF THE INVENTION

In view of the foregoing, it is an object of the present invention to provide a method for ascertaining an optimized movement profile for a servo press while avoiding a collision with a transfer system.

This and other objects and advantages are achieved in accordance with the invention by a method for planning movements for a servo press, where at least one transport apparatus for moving one or more goods to be processed by the servo press being provided in a manner spatially integrated into the servo press, which includes the steps of ascertaining a minimum transfer time and a minimum return time for a movement cycle of the transport apparatus; and calculating a servo press movement profile, where the calculation includes parameters set by the servo press and/or the forming process, a geometric press opening and a geometric press closure and the minimum transfer time and the minimum return time, where a time phase emerging from the geometric press opening and the geometric press closure facilitates a collision-free movement of the transport apparatus and of the servo press, taking account of geometric conditions of the transport apparatus and servo press.

The transport apparatus is provided in or on the servo press. Here, the transport apparatus comprises components, in particular, which are provided or configured to grip the goods to be processed by the servo press. By way of example, grip arms or clamps are provided, which move the material within the servo press between the various forming process stages.

Here, a transport apparatus should be understood to mean a transfer or transfer apparatus or a gripper feed or roller feed or a movement robot that, as a handling task, comprises the transfer movement of goods to be processed by a press.

In a roller feed, material is pushed into a press by two rotating rollers. The advance movement should be synchronized with the press in order to ensure a transfer of the material during the press opening phase.

The transport apparatus is integrated into the servo press such that, in a closed state of the servo press, the transport apparatus may be situated outside of the press workspace or may be situated in a recess of the servo press.

The transport apparatus comprises a multiplicity of grip apparatuses, in particular, which can receive a plurality of goods to be processed by the servo press and can transfer these in a synchronous manner within the servo press. By way of example, a servo press comprises ten processing stations and nine goods are transported from one processing station to the next in each transfer process. One item of goods, specifically the item of goods situated within the last processing station in the feed direction, is transported out of the servo press and a new item of goods to be processed is introduced into the first processing station at the same time.

The servo press movement profile is ascertained by virtue of being calculated using a calculation unit or being read from a memory area, for example. The servo press movement profile takes account of parameters that are set by the servo press and/or the forming process. Consequently, the servo press movement profile includes parameters that are influenced by the servo press itself or by the forming process to be performed by the servo press. Here, the material or a material thickness, which determine or influence the forming process, may also be included.

By way of example, mechanical, electric and/or process limits are included in the servo press movement profile.

The servo press movement profile may describe a circulation operation or a to-and-fro operation or any other operation.

A minimum transfer time should be ascertained based on the transport apparatus itself. The configuration of the transport apparatus and, in particular, the drives thereof set the minimum transfer time required for the feed. Here, the transport apparatus is operated at its maximum speed, in particular. Here, the minimum transfer time can be ascertained based on a test in the real servo press or can be ascertained based on geometric data of the transfer path and the dynamics of the transport apparatus, such as a maximum possible speed or acceleration, a deceleration or a jerk, which are ascertainable from the drive characteristics of the transport apparatus drives. The minimum transfer time emerges, for example, for a 3D transfer from a minimum time period required for gripping and lifting the goods, from the minimum time period for the feed within the press to the next processing station and a minimum time period required for lowering and putting down the goods. In the case of a gripper or a roller feed, the minimum transfer time is a minimum feed time period, for example.

Likewise, a minimum return time should be ascertained based on the transport apparatus itself. Depending on the configuration of the transport movement, the return time may also mean a limitation of the servo press movement profile, for example, if a transfer for the return requires a longer time period than the servo press requires for the forming. For a 3D transfer, the minimum return time emerges, for example, from a minimum time for driving out of the press after putting down material, a minimum time period for the return and a minimum time for entering into the press up to the reception of new material.

A servo press profile ascertained via the proposed method deviates from a profile for the servo press that is calculated without taking account of the transport movement, particularly if the minimum transfer time exceeds the time period provided for the transfer movement on account of geometric conditions in the press. Expressed differently, a servo press movement profile should be adapted to the transfer movement if, in particular, the transport apparatus cannot fully perform the transport of the goods to be processed within the time period during which no collision occurs. If the minimum transfer time exceeds the available time period, then the minimum feed time is used as an input parameter for calculating the servo press movement profile and the minimum feed time influences the latter. The influence of the transport movement has the same effect on the servo press profile during the return of the transport apparatus if the minimum return time exceeds the time period set by the phase between press closure and press opening by the non-adapted press profile.

In the present application, the feed refers to the movement that relates to the transfer, i.e., the movement of the goods within the servo press, within a region with a risk of collision. By way of example, in the case of a 3D transfer, the feed movement starts in this case following a closure of the transfer and lifting of the goods, and ends prior to the lowering process.

In the present application, the movement of the transport apparatus over the entire movement cycle is referred to as transport movement.

A transfer movement refers to the movement of the transport apparatus relating to the transfer of the goods, i.e., from the point in time when the goods moved, e.g., when these are received, including the feed, until such goods are deposited. The transfer movement is performed within the transfer time.

Accordingly, the remaining part of a cycle of the transport movement, which is not the transfer movement, is referred to as return movement. The return movement is performed within the return time.

Advantageously, the alignment of a servo press movement profile to temporal characteristics of a transfer movement profile is facilitated.

The geometric press opening is described by a mechanical variable of the press, such as an angle, an eccentric angle, a stroke or a position, which describes the opened state of the press such that the transport apparatus can start the transfer movement without collisions. By way of example, in the case of a 3D transfer, this is the state in which the transfer can drive into the press and can perform the transfer there. Here, the transport system including the transport apparatus, for example, of the gripper, is taken into account in each case. Here, a collision should be avoided between the servo press and all components of the servo press and the transport apparatus with all its components and the goods to be processed, particularly during the lifting movement, too. The geometric press opening and press closure depends on the geometric configuration of the servo press and, further, on the geometric configuration of the transport apparatus. By way of example, the geometric dimensions of the servo press and of the transport apparatus should be taken into account. Further, the geometry of the goods to be processed or of a plurality of goods to be processed within the servo press, in the various forming stages, also has an effect on the region with a risk of collisions. Depending on size, form or weight, the goods to be transferred can be arranged differently in space depending on the transport path or depending on the station. A collision between the transport apparatus including the workpiece and the servo press should be avoided for all transfer paths.

The servo press movement profile being rigidly adapted to the minimum feed time period or the minimum return time and the servo press movement merely being scaled accordingly, as it were, is advantageously avoided in a case where the transfer time or the return time is longer than a time period available for the transport process within, or outside of, the region with a risk of collisions. Disadvantageously, such upscaling taking account of the movement of the transfer is also linked to a corresponding poorer stroke frequency. However, if the servo press movement profile is optimized taking account of the minimum transfer time and the minimum return time, then it is possible, for example, to appropriately delay a portion of the servo press movement profile, during which the transport system performs the feed movement, but, at the same time, it is possible for the forming process itself to be performed unchanged in an optimized manner, in particular with an unchanged speed, such as in accordance with a servo press movement profile that would also be ascertained without taking account of the transfer in this movement portion. Overall, a stroke frequency of a servo press installation with the transport apparatus changes in a case where the servo press movement profile should be adapted on account of the time required for the feed movement of the transfer; however, the stroke frequency advantageously only becomes worse to the least possible extent.

If the servo press movement profile is likewise optimized taking account of the minimum return time, it is possible, for example, to appropriately delay a portion of the servo press movement profile during which the transport system performs the return. At the same time, it is also possible for the press movement outside of the collision-critical region to be performed unchanged in an optimized manner, in particular with an unchanged speed, such as in accordance with a servo press movement profile that would also be ascertained without taking account of the transfer in this movement portion. Overall, a stroke frequency of a servo press installation with the transport apparatus changes in a case where the servo press movement profile should be adapted on account of the time required for the return movement of the transfer; however, the stroke frequency advantageously only becomes worse to the least possible extent.

Advantageously, a modification of the forming process or a conversion for a new tool is also easily possible and, in particular, possible without a renewed complicated setup of the transfer movement and the servo press movement profile. By way of example, if the transport apparatus requires more time on account of a new tool, a servo press movement profile can be ascertained based on the presented method. In so doing, a collision between the servo press and the transport apparatus, including the workpiece, is precluded and, at the same time, an optimized stroke frequency is ensured. The servo press can be operated with an optimized movement profile and without a trial-and-error method with correspondingly linked downtimes and reject-producing cycles.

In accordance with one embodiment, the servo press movement profile is optimized toward a goal of a maximum servo press performance. This means that a stroke frequency that is as high as possible is ensured, taking account of the predetermined parameters and boundary conditions.

In another embodiment, a servo press movement profile that only takes account of parameters of the servo press or of the forming process but not of the transfer is optimized toward a goal of maximum servo press performance. Proceeding from this ascertained servo press movement profile, the transport apparatus input parameters in accordance with the invention are then additionally predetermined. The optimization to be calculated is then implemented, in turn, under the prescription that a maximum press performance is obtained. Maximum stroke frequency, in this case, means minimum possible cycle duration. That is, a press cycle should be as short as possible.

In accordance with an embodiment, the servo press movement profile is optimized toward a goal of a maximum servo press performance, taking account of further input parameters, such as energy-optimizing delays. By way of example, a stroke frequency or cycle time of the servo press that should not be exceeded is chosen in order to facilitate an energy-optimized adaptation to a preceding or subsequent processing process.

In accordance with an embodiment, a maximum motor speed, a maximum slide speed, a predeterminable optimal forming speed and/or geometric dimensions of a work region are included as parameters of the servo press and/or of the forming process. Further parameters may be included depending on the application. Consequently, the servo press movement profile is also optimized in view of the press parameters and forming parameters.

In accordance with an embodiment, the dimensions of the transport apparatus and of the servo press are included in the geometric conditions. In particular, these advantageously do not change during the operation of the servo press. An adaptation during the operation may be required if a forming process is adapted such that the processed workpiece has modified dimensions. As a result, a modified gripping mechanism, for example, may be required on the transport apparatus, where the mechanism modifies the dimensions of the transport apparatuses overall. Moreover, various tools that are used should advantageously be taken into account by virtue of a servo press movement profile and a movement profile of the transport apparatus being optimized in a manner adapted to the individual tools.

Alternatively, dimensions of the workpiece are additionally included as geometric conditions, particularly if a workpiece protrudes beyond the dimensions of the transport apparatus during the transfer.

In accordance with another embodiment, the geometric press opening is determined based on a servo press opening angle, at which a collision of the transport apparatus with the servo press is prevented at the start of a transfer movement. Here, the servo press opening angle, particularly in the servo press movement profile, relates to a crank angle from 0 to 360°. The servo press range specifically describes the state in which the press is open just so far that the transfer movement can start without a collision. By way of example, it is a point to be defined within the closing movement in the case of a 3D transfer.

In accordance with another embodiment, the geometric press closure is determined based on a servo press closure angle, at which a collision of the servo press with the transport apparatus is prevented at the end of a transfer movement. This is a point to be defined during the closing movement of the transfer in the case of a 3D transfer. In the case of a so-called XZ transfer, this is a point during the lowering movement, for example.

The servo press opening angle and servo press closure angle are therefore influenced by the type of the transport system and by the geometric conditions thereof.

In accordance with a further embodiment, a movement profile of the transport apparatus is referenced based on the servo press movement profile. Once the servo press movement profile and the movement profile of the transport apparatus have been ascertained in a manner fitting to one another based on the optimization, the movement profile of the transport apparatus should still be adapted or synchronized in respect of the master values. Here, there is a change in the relationship between virtual master value and the press opening, for example as a result of a change in the press profile, such that the master value must be adapted, e.g., displaced, so that the movements fit together.

A servo press cycle is adapted to the transfer cycle in embodiments of the invention if the servo press cycle is shorter than the transfer cycle. By way of example, the maximum achievable transfer cycle of a transfer on account of the speed limits serves as a master. Expressed differently, the transfer can specify all relevant times: the transfer time and return time, and consequently also the cycle time.

In particular, this adaptation of the cycle times between servo press and transfer is implemented in advance, i.e., prior to the optimization, by virtue of the transfer with its maximum achievable speeds serving as a master for setting the servo press cycle. The servo press cycle ascertained thus can be considered a further input parameter for the profile optimization.

In accordance with yet another embodiment, an adapted movement profile of the transport apparatus is calculated based on the servo press movement profile. By way of example, the cycle duration of the transport apparatus is fitted to the modified servo press cycle arising based on the adapted servo press movement profile. By way of example, the return time is adapted such that press and transfer overall operate with a corresponding cycle. As a result, the servo press and transfer are then displaced with a corresponding cycle which, under the condition of a collision-free movement of transfer and servo press, represents a shortest possible cycle.

It is also an object of the invention to provide a movement controller comprising an optimization unit configured to plan movements for a servo press, where at least one transport apparatus for moving one or more goods to be processed by the servo press is provided in a manner spatially integrated into the servo press.

The movement controller comprises a first unit for ascertaining a minimum transfer time and a minimum return time for a movement cycle of the transport apparatus, a second unit for calculating a servo press movement profile, where parameters set by the servo press and/or the forming process, a geometric press opening and a geometric press closure and the minimum transfer time and the minimum return time can be predetermined for the second unit, and where a time phase emerging from the geometric press opening and the geometric press closure facilitates a collision-free movement of the transport apparatus and of the servo press, taking account of geometric conditions of the transport apparatus and servo press.

The respective unit can be implemented in terms of hardware and/or else in terms of software. The respective unit can be formed as an apparatus or as part of an apparatus, for example as a computer or as a microprocessor, in the case of an implementation in the form of hardware. The respective unit can be formed as a computer program product, as a function, as a routine, as part of a program code or as an executable object in the case of an implementation in terms of software.

It is a further object of the invention to provide a computer-readable medium (i.e., a computer program product) having a computer program comprising means for performing the method in accordance with the above-described embodiments when the computer program is executed on a program-controlled device.

A computer program product such as a computer program means, for example, can be provided or supplied as, for example, a storage medium such as a memory card, a USB stick, a CD-ROM, a DVD, or else in the form of a downloadable file from a server on a network. By way of example, in a wireless communications network, this can be implemented by transferring a corresponding file with the computer program product or the computer program means. A control device, such as a microprocessor or the like, in particular, comes into question as a program-controlled device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below on the basis of exemplary embodiments with the aid of the figures, in which.

DETAILED DESCRIPTION OF THE EXEMPLARY EMBODIMENTS

Provided nothing else has been specified, functionally equivalent elements have been provided with the same reference signs in the figures.

Figures 1, 2:
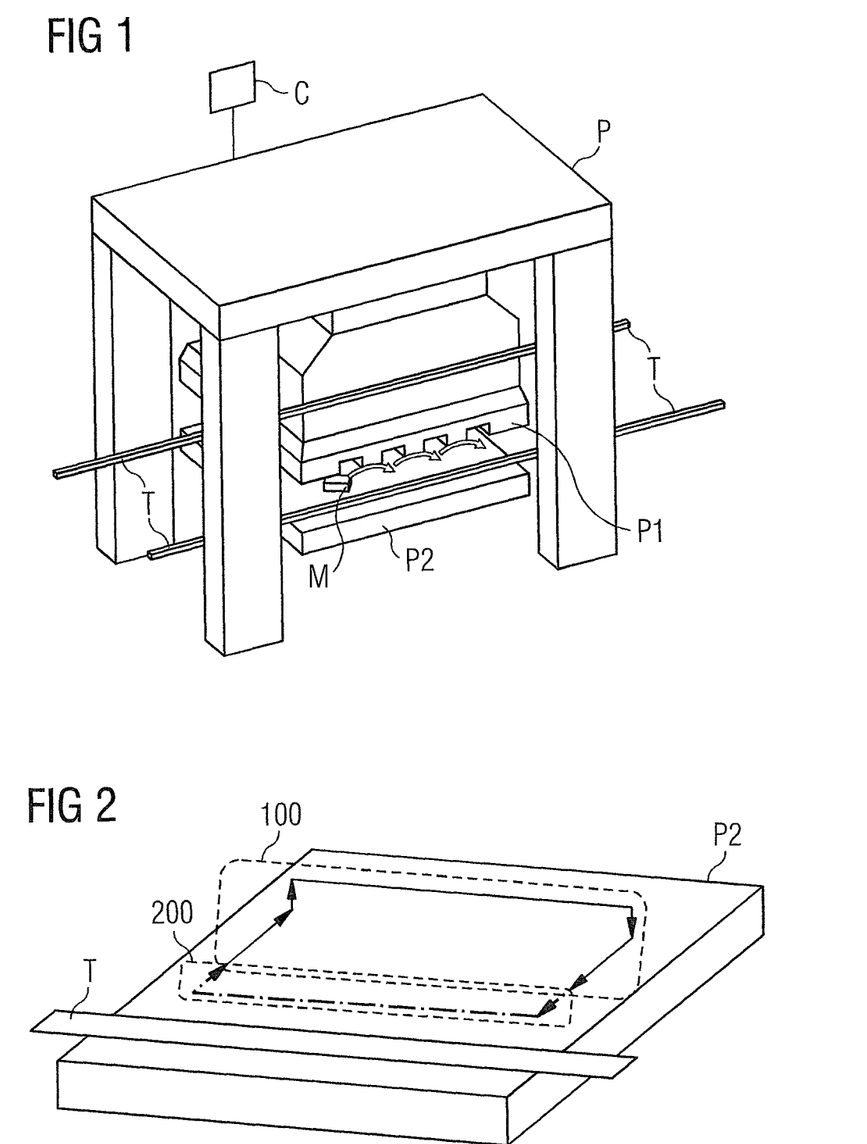
FIG. 1 shows a schematic illustration of a servo press with a transfer in accordance with the prior art.
FIG. 2 shows a schematic illustration of a movement of a 3D transfer in relation to a servo press.

FIG. 1 schematically illustrates a servo press P, which comprises an upper tool P1 and a lower tool P2. A plurality of processing stations arise within the servo press P on account of the configuration of the upper tool P1 and/or of the lower tool P2. Goods M to be processed, such as a workpiece made of a certain material, are transported within the servo press P from one processing station to the next via a "transfer" T, which is elucidated by arrows in FIG. 1. The method for a 3D transfer is presented purely in an exemplary manner. The method is likewise advantageously usable in the case of XY transfers or XZ transfers or gripper feeds or roller feeds.

A movement controller C is provided to control the movement of the servo press.

FIG. 2 elucidates how a transfer T typically moves within the servo press P described within the scope of FIG. 1. The lower tool P2 is imaged next to the transfer T and the movement of the transfer T in relation to the lower tool P2 is indicated via the path marked by arrows. Here, the movement illustrated based on the arrows should merely be elucidated in relation to the geometry of the servo press. A potentially possible movement of the lower tool P2 should not be taken into account in the illustration.

The moving process of the transfer is subdivided into two movement portions. Firstly, the movement is characterized by a transfer time. The movement occurring during the transfer time comprises the portions that are shown within the boundary 100. In the process, the transfer T passes in part through a step of closing, in which a workpiece is received, for example, followed by a step of lifting, during which the workpiece is lifted. The actual feed, during which the workpiece is transferred to the next processing station, is implemented subsequently. Finally, this is followed by a lowering, during which the workpiece is put down and, in part, an opening of the transfer, during which the transfer retracts from the workspace. The return time adjoins a transfer cycle, where the return time expires while the press is closed. In FIG. 2, the associated movement portion is denoted by reference sign 200. Here, the transfer drives even further out of the press, for example, or it drives into a side region of the press and returns into the initial position there, ready to penetrate back into the press again as soon as this is possible without collisions. By way of example, the movement portions may overlap during the return time. By way of example, the return movement, which is implemented counter to the feed, starts before the opening movement of the transfer has been fully completed.

Figure 3:
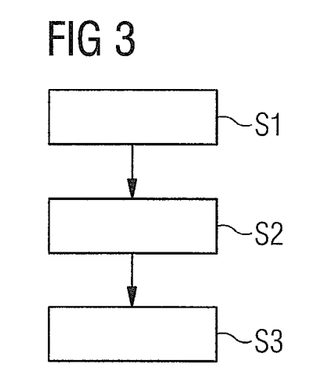
FIG. 3 shows a schematic illustration of the procedure of a method for planning movements for a servo press in accordance with a first exemplary embodiment of the invention.

FIG. 3 only schematically sketches a procedure of the method, in which a minimum transfer time and a minimum return time for a movement cycle of the transfer are ascertained in a first step S1 in accordance with a first exemplary embodiment of the invention. This first step can be implemented based on measurements during a running operation of the servo press, such as when setting up the servo press. Alternatively, the temporal characteristics of the transfer at any time may be calculated.

A servo press movement profile is calculated in a second step S2, where the calculation firstly includes parameters that are set by the servo press and/or the forming process. By way of example, an ideal forming speed is provided or a maximum machine speed is realizable. These parameters influence and limit the movement of the servo press. A geometric press opening and a geometric press closure and the minimal transfer time and the minimal return time are also included, where a time phase that emerges from the geometric press opening and the geometric press closure facilitates a collision-free movement of the transfer and of the servo press while taking account of geometric conditions of the transfer and servo press. In particular, the time phase is the time available for the path 100 from FIG. 2.

Advantageously, the minimum transfer time partly also comprises the penetration into the press and partly includes leaving the press, and hence also receiving and putting down the workpiece. The transfer time is advantageously defined over the entire movement process of the transfer, which requires an opened position of the servo press.

In the case where, for example, the minimum transfer time is already shorter than, or of equal length as, a time period from a servo press movement profile without taking account of the transfer, the press-specific input parameters provide the limitations during the optimization. The transfer is then fast enough to perform the feed movement including receiving the workpiece and putting it down in the next processing station within the time in which the servo press is open and the press can perform the movement in the opened position as quickly as possible, for example, taking account of a maximum motor speed.

Here, the servo press movement profile is adapted such that the minimum transfer time is included in the calculation as an input parameter. By way of example, an optimization algorithm that can take account of the minimum transfer time is provided.

The minimum transfer time may be a minimum transfer time that is optimized in view of the performance of the servo press and the energy consumption of the servo press. In particular, this need not relate to the absolutely shortest possible transfer time that can be performed by the transfer. By contrast, it is equally possible for a slightly longer time period to be adopted, such as to operate more energy efficiently.

The transfer is referenced in the third step S3. Consequently, a workflow for adapting a servo press movement profile and a transport apparatus movement profile is advantageously provided, the result of which is an optimized movement of the servo press which ensures a freedom of collisions at the same time.

Figure 4:
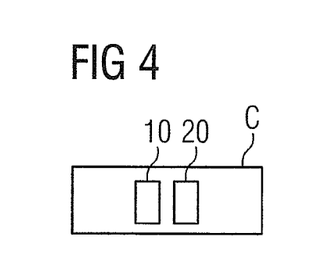
FIG. 4 shows a schematic illustration of a movement controller embodied for planning movements for a servo press in accordance with a second exemplary embodiment of the invention.

FIG. 4 schematically images the structure of a movement controller C. Provision is made of a first unit 10 for ascertaining a minimum transfer time and a minimum return time for a movement cycle of the transport apparatus. By way of example, the minimum transfer time and the minimum return time can be ascertained in a separate method step, during which the transport apparatus transports a workpiece at a maximum possible speed during a test phase. By way of example, only the value of the times that can be realized by the transport apparatus are stored in the first unit 10 in this case. In an alternative embodiment, the first unit 10 may comprise an input interface such that the times that can be realized by the transport apparatus can be predetermined for the movement controller C, such as by an operator of the installation.

A second unit 20 is configured to perform the calculation of the optimization. To this end, provision is made, in particular, for an optimization algorithm in the second unit, such as a processor unit of the controller C, which calculates the servo press movement profile taking account of the parameters of the press and of the transport apparatus.

Advantageously, the servo press movement profile calculated by the second unit 20 is made available to a movement controller of the transport apparatus, which adapts the movement profile of the transport apparatus to the servo press movement profile. The movement controller of the transport apparatus is integrated into that of the servo press, for example, such that the data of the calculated servo press movement profile are made available within the controller C to a unit that creates the transport apparatus movement profile.

Alternatively, the movement controllers of servo press and transport apparatus have separate configurations and parameters that emerge from the calculated servo press movement profile for the movement controller of the transport apparatus, such as a calculated servo press cycle or referencing points for synchronizing the movement of servo press and transport apparatus, are made available to the movement controller of the transport apparatus by way of a communications link.

Figure 5:
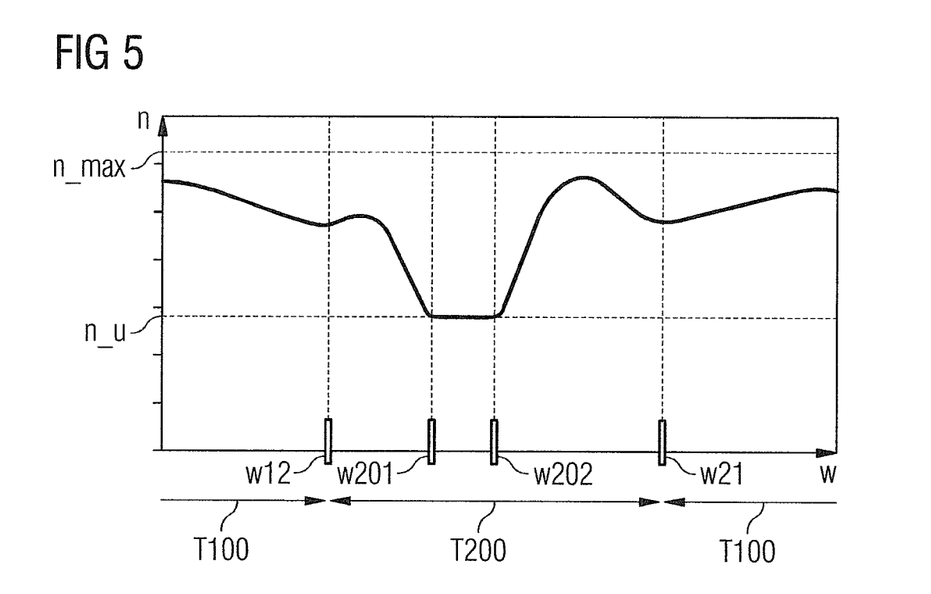
FIG. 5 shows a movement curve for a servo press, ascertained using a method in accordance with a third exemplary embodiment of the invention.

FIG. 5 shows, plotted in a diagram, a movement curve for a cam press with a transfer described in a third exemplary embodiment of the invention. FIG. 5 plots the cam rotational speed n in strokes per minute against the crank angle w in degrees. Here, the crank angle profile is illustrated from 0° to 360°, i.e., over a press cycle. Consequently, the horizontal axis plots the crank angle w and the vertical axis specifies the cam rotational speed n. In a crank angle range whose time period corresponds to the return time T200 in the movement profile of the transfer, the servo press is in a state in which the slide is lowered so far that the transfer cannot dwell in the press workspace without collisions. Therefore, it is necessary to ensure that the return of the transfer has already started as soon as a servo press closure angle w12, at which the press position is closed, has been reached. By way of example, from the view of the transfer, the press is closed above a crank angle w of 90°, and so an action of the transfer is no longer possible above this press angle.

An open position of the press is reached above a servo press opening angle w21 of 270°, for example. That is, the transfer movement can be performed above this angle. A transfer time T100 can then occur beyond 360° in the next press cycle, up to the servo press closure angle w12. By way of example, a maximum motor speed n_max and an optimal forming speed n_u at which the forming process should occur are included in a calculation of a servo press movement profile according to the prior art. By way of example, this forming process occurs in a range from 160° to 180° of the crank angle w, with the start of the forming movement being denoted by the reference sign w201 and the end of the forming movement being denoted by the reference sign w202. This range is also referred to as work range. Moreover, the calculation includes maximally realizable movement times for the transfer movement and return movement for the transfer, i.e., the shortest possible realizable transport times in the case of maximum speed and acceleration of the transport apparatus. By way of example, the times are such that the servo press can be operated in a manner optimized toward the goal of maximum performance, without having to be decelerated on account of the transfer.

Figure 6:
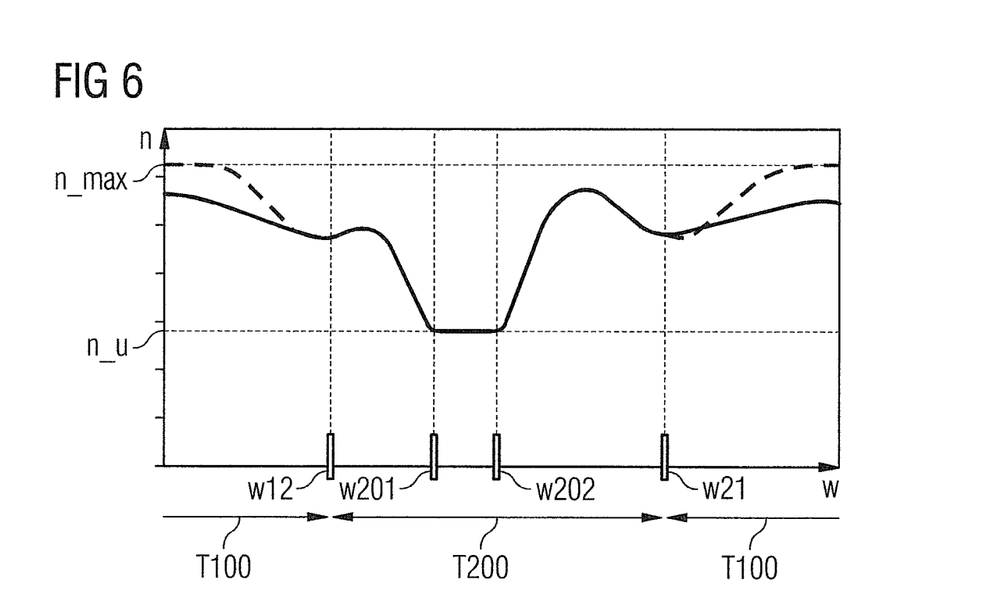
FIG. 6 shows a movement curve of a servo press, ascertained in accordance with a method for planning movements for a servo press according to a fourth exemplary embodiment of the invention.

For elucidation purposes, FIG. 6 illustrates the movement curve in a diagram analogous to that of FIG. 5, in which the transfer and the transfer time and return time realizable by the transfer have such an effect on the servo press profile that braking is implemented during the feed. In accordance with the fourth exemplary embodiment of the invention, the time requirement of the transfer for the feed is, e.g., greater than the time period that the press makes available for this process without taking account of the transfer. The press would be operated at maximum speed and would then be set such that the slide is moved as quickly as possible to the top and down again, i.e., in the region of the upper reversal point, in the range outside of the work range and, in particular, as soon as the press is opened. The movement curve of the servo press that is possible in this range on account of the servo press optimization without taking account of the transfer is plotted in FIG. 6 using a dashed line and it corresponds to the movement profile ascertained based on FIG. 5 if the transfer can bring about the feed in a sufficiently short time.

The servo press movement profile is adapted in the range of the crank angle w that corresponds to the transfer time T100, in which the feed is performed, where the transfer time once again is included as an input parameter, the transfer time being able to bring about the transfer and now having a corresponding effect on the optimization. The curve, thus ascertained is characterized by a lower cam rotational speed in the region of the open crank angle to the right of the press opening angle w21 or to the left of the press closure angle w12.

At the same time, this means that the time period that the transfer has available for the feed is now longer, specifically precisely so long as it should be as a minimum in order to be able to transfer workpieces into the press in collision-free fashion.

The movement controller of the transfer adapts the movement of the transfer to the adapted servo press movement profile in turn so that the movements are performed in a correspondingly synchronized manner. In particular, referencing is performed based on a synchronization to the virtual master value, which is predetermined for the movement controller from the movement profile of the press.

Figure 7:
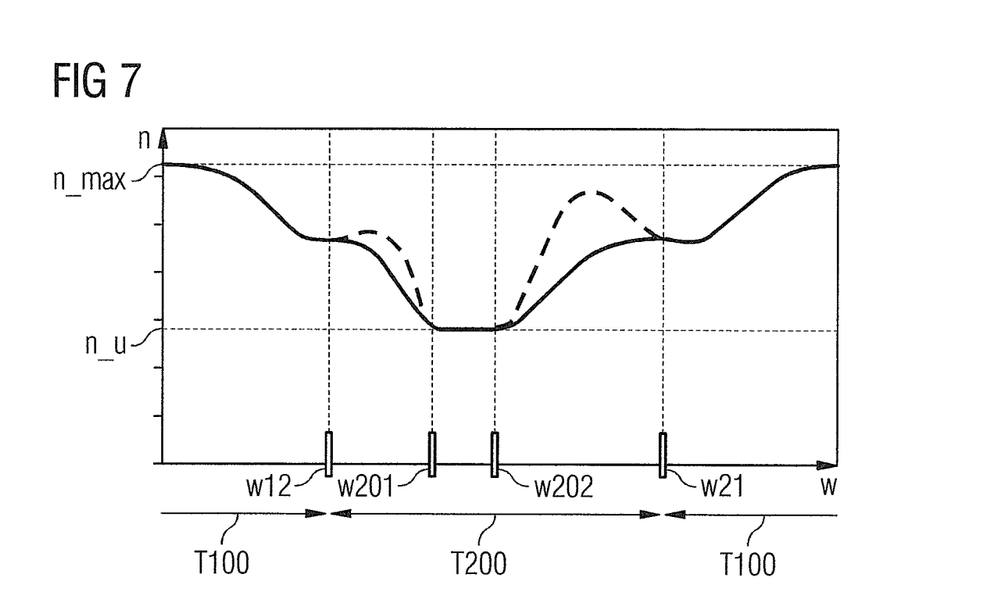
FIG. 7 shows a movement curve of a servo press, ascertained in accordance with a method for planning movements for a servo press in accordance with a fifth exemplary embodiment of the invention.

A fifth exemplary embodiment of the invention is described based on FIG. 7. Here, the time requirement of the transfer for the journey back into the main position is greater than the time period that the servo press makes available for this movement portion. Accordingly, the servo press movement profile is adapted in the portion in which the crank angle w means a closed position. In the diagram, this portion is denoted by the region to the right of the press closure angle w12 and to the left of the press opening angle w21. It corresponds to the movement portion during the return time T200. The so-called work range, during which the forming occurs, should be excluded from the optimization. In this range, the press moves without change with the ideal forming speed. The cam rotational speed is reduced therebefore and thereafter in each case in order to make available a longer time interval within which the transfer implements the return movement. The movement curve of FIGS. 5 and 6 is illustrated with a dashed line in the range between w12 and w201 and between w202 and w21.

There is an optimization in view of the transfer time and an optimization in view of the return time in further configurations. This corresponds to a combination of the fourth exemplary embodiment with the fifth exemplary embodiment. As a result, the servo press is braked in optimized manner, i.e., braked so far and in those portions that a collision-free transport of the workpiece to be pressed is facilitated with, at the same time, only as little braking as possible being carried out.

The disclosed embodiments of invention thus relate to a method for planning movements for a servo press and a movement controller configured to plan movements for a servo press and an associated computer program product, where a minimum transfer time and a minimum return time in a movement cycle of a transport apparatus are taken into account.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for planning operational movements for a servo press, at least one transport apparatus being arranged within the servo press, the method comprising:

ascertaining a minimum transfer time and a minimum return time for a movement cycle of the transport apparatus;

performing a non-iterative calculation of a servo press movement profile taking into account geometric conditions of the at least one transport apparatus and the servo press, wherein the non-iterative calculation includes parameters set by (i) at least one of the servo press and a forming process, (ii) a geometric press opening and a geometric press closure and (iii) the minimum transfer time determined when the at least one transport apparatus is operated at a maximum speed, and the minimum return time, and wherein a time period occurring during the geometric press opening and the geometric press closure facilitates a collision-free movement of the at least one transport apparatus and the servo press; and operating the servo press based on the calculated servo press movement profile;

wherein the minimum transfer time is based on at least a minimum time period required for gripping and lifting goods, a minimum time period for feeding the goods within the servo press to a next processing station and a minimum time period required for lowering and putting down the goods.

2. The method as claimed in claim 1, wherein the servo press movement profile is optimized to achieve a maximum servo press performance.

3. The method as claimed in claim 2, wherein the servo press movement profile is optimized to achieve a maximum servo press performance, utilizing further input parameters comprising energy-optimizing delays.

4. The method as claimed in claim 1, wherein the servo press movement profile is optimized to achieve a maximum servo press performance, utilizing further input parameters comprising energy-optimizing delays.

5. The method as claimed in claim 1, wherein a maximum motor speed, a maximum slide speed, at least one of (i) a predetermined optimal forming speed and (ii) a geometric dimensions of a work region are included as parameters of at least one of (i) the servo press and (ii) the forming process.

6. The method as claimed in claim 1, wherein dimensions of the at least one transport apparatus and the servo press are included in the geometric conditions.

7. The method as claimed in claim 1, wherein the geometric press opening is determined based on a servo press opening angle which prevents a collision of the at least one transport apparatus with the servo press at a start of a transfer movement.

8. The method as claimed in claim 1, wherein the geometric press closure is determined based on a servo press closure angle which prevents a collision of the servo press with the at least one transport apparatus at the end of a transfer movement.

9. The method as claimed in claim 1, wherein a reference for the movement profile of the at least one transport apparatus is established based on the servo press movement profile.

10. The method as claimed in claim 1, wherein an adapted movement profile of the at least one transport apparatus is calculated based on the servo press movement profile.

11. A movement controller comprising an optimization unit configured to plan operational movements for a servo press, at least one transport apparatus being arranged within the servo press, the movement controller comprising:

a processor including memory;

a first unit for ascertaining a minimum transfer time and a minimum return time for a movement cycle of the at least one transport apparatus; and a second unit for performing a non-iterative calculation of a servo press movement profile taking into account geometric conditions of the at least one transport apparatus and servo press, wherein parameters set by (i) at least one of the servo press and a forming process, (ii) a geometric press opening and a geometric press closure and (iii) the minimum transfer time determined when the at least one transport apparatus is operated at a maximum speed, and the minimum return time are predetermined for the second unit for the non-iterative calculation, and wherein a time period occurring during the geometric press opening and the geometric press closure facilitates a collision-free movement of the at least one transport apparatus and of the servo press;

wherein the movement controller controls operation of the servo press based on the calculated servo press movement profile; and wherein the minimum transfer time is based on at least a minimum time period required for gripping and lifting goods, a minimum time period for feeding the goods within the servo press to a next processing station and a minimum time period required for lowering and putting down the goods.

12. A non-transitory computer-readable medium encoded with a computer program which, when executed by a program-controlled device, causes planning of operational movements for a servo press, at least one transport apparatus being arranged within the servo press, the program controlled device being configured to:

ascertain a minimum transfer time and a minimum return time for a movement cycle of the transport apparatus;

perform a non-iterative calculation of a servo press movement profile taking into account geometric conditions of the at least one transport apparatus and the servo press, wherein the non-iterative calculation includes parameters set by (i) at least one of the servo press and the forming process, (ii) a geometric press opening and a geometric press closure and (iii) the minimum transfer time determined when the at least one transport apparatus is operated at a maximum speed, and the minimum return time, and wherein a time period occurring during the geometric press opening and the geometric press closure facilitates a collision-free movement of the at least one transport apparatus and the servo press; and operate the servo press based on the calculated servo press movement profile;

wherein the minimum transfer time is based on at least a minimum time period required for gripping and lifting goods, a minimum time period for feeding the goods within the servo press to a next processing station and a minimum time period required for lowering and putting down the goods.

\* \* \* \* \*